(12) United States Patent
Tracy et al.

(10) Patent No.: US 11,453,355 B2
(45) Date of Patent: Sep. 27, 2022

(54) SYSTEMS AND METHODS FOR A MATERIAL HANDLING VEHICLE WITH A MULTI-PIECE BUMPER ASSEMBLY

(71) Applicant: The Raymond Corporation, Greene, NY (US)

(72) Inventors: Erik C. Tracy, Johnson City, NY (US); Kevin T. Bordwell, Binghamton, NY (US)

(73) Assignee: The Raymond Corporation, Greene, NY (US)

( * ) Notice: Subject to any disclaimer, the term of this patent is extended or adjusted under 35 U.S.C. 154(b) by 358 days.

(21) Appl. No.: 16/837,899

(22) Filed: Apr. 1, 2020

(65) Prior Publication Data

US 2020/0317148 A1 Oct. 8, 2020

Related U.S. Application Data

(60) Provisional application No. 62/828,106, filed on Apr. 2, 2019.

(51) Int. Cl.
*B60R 19/48* (2006.01)
*G01S 13/931* (2020.01)
*B60R 19/02* (2006.01)
*B66F 9/075* (2006.01)

(52) U.S. Cl.
CPC .......... *B60R 19/023* (2013.01); *B60R 19/483* (2013.01); *B66F 9/07513* (2013.01); *G01S 2013/93275* (2020.01)

(58) Field of Classification Search
CPC ....... B60R 19/483; B60R 19/12; B60R 19/04; B60R 19/023; B60R 19/18; G01S 2013/93275; G01S 13/931; B66F 9/07513
See application file for complete search history.

(56) References Cited

U.S. PATENT DOCUMENTS

| 7,527,308 | B2 | 5/2009 | Buniewicz et al. |
| 8,731,777 | B2 | 5/2014 | Castaneda et al. |
| 8,985,649 | B2 * | 3/2015 | Lutz ........................ B60R 19/18 293/120 |
| 2011/0150598 | A1 * | 6/2011 | Mitsuo .................. F16B 5/0628 411/48 |
| 2016/0114748 | A1 * | 4/2016 | Hare ..................... B60R 19/023 293/106 |

(Continued)

FOREIGN PATENT DOCUMENTS

| CN | 105235618 A | 1/2016 |
| JP | H08113481 A | 5/1996 |
| JP | 2018111367 A | 7/2018 |

OTHER PUBLICATIONS

European Patent Office, Extended European Search Report, Application No. 20167613.7, dated Jun. 18, 2020, 7 pages.

*Primary Examiner* — Gregory A Blankenship
(74) *Attorney, Agent, or Firm* — Quarles & Brady LLP

(57) ABSTRACT

A bumper assembly for a material handling vehicle is provided. The bumper assembly includes a main body which includes at least one cutout. The bumper assembly also includes a window plate that may be removably coupled to the main body and cover the at least one cut out. The bumper assembly can also include a lower section that may be removably coupled to the main body and includes a protection plate extending below the at least one cutout.

20 Claims, 5 Drawing Sheets

(56) References Cited

U.S. PATENT DOCUMENTS

| | | | |
|---|---|---|---|
| 2016/0121832 A1* | 5/2016 | Hare | B60R 19/48 |
| | | | 293/106 |
| 2017/0057441 A1 | 3/2017 | Perucca et al. | |
| 2018/0057329 A1 | 3/2018 | Poschl et al. | |
| 2019/0198986 A1* | 6/2019 | Singh | H01Q 1/3283 |
| 2019/0248313 A1* | 8/2019 | Garbutt | B60R 19/18 |
| 2019/0366963 A1* | 12/2019 | Kumashiro | B60R 19/483 |
| 2020/0114851 A1* | 4/2020 | Agarwal | G01S 17/931 |
| 2021/0247493 A1* | 8/2021 | Agarwal | B60R 11/04 |
| 2021/0323483 A1* | 10/2021 | Hwang | B60R 19/483 |

\* cited by examiner

SYSTEMS AND METHODS FOR A MATERIAL HANDLING VEHICLE WITH A MULTI-PIECE BUMPER ASSEMBLY

CROSS-REFERENCES TO RELATED APPLICATIONS

The present application is based on and claims priority to U.S. Provisional Patent Application No. 62/828,106, filed on Apr. 2, 2019, and entitled "Systems and Methods for a Material Handling Vehicle with a Multi-Piece Bumper Assembly."

STATEMENT REGARDING FEDERALLY SPONSORED RESEARCH

Not Applicable.

BACKGROUND

In general, material handling vehicles may include a bumper arranged on one or more ends of the vehicle frame/body to cover components mounted behind the bumper and/or to cover the vehicle frame/body.

BRIEF SUMMARY

The present invention relates generally to material handling vehicles and, more specifically, to a bumper assembly on a material handling vehicle.

In one aspect, the present disclosure provides a bumper assembly for a material handling device. The bumper assembly includes a main body, which includes at least one cutout. The bumper assembly also includes a window plate removably coupled to the main body and covering the at least one cutout. The bumper assembly further includes a lower section. The lower section is removably coupled to the main body and includes a plate extending below the at least one cutout.

In another aspect, the present disclosure provides a material handling vehicle including an object detection sensor and a bumper assembly. The bumper assembly includes a main body, which includes at least one cutout. The bumper assembly also includes a window plate removably coupled to the main body and covering the at least one cutout. The bumper assembly further includes a lower section. The lower section is removably coupled to the main body and includes a plate extending below the at least one cutout.

The foregoing and other aspects and advantages of the disclosure will appear from the following description. In the description, reference is made to the accompanying drawings which form a part hereof, and in which there is shown by way of illustration a preferred configuration of the disclosure. Such configuration does not necessarily represent the full scope of the disclosure, however, and reference is made therefore to the claims and herein for interpreting the scope of the disclosure.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

DETAILED DESCRIPTION

Figure 1:
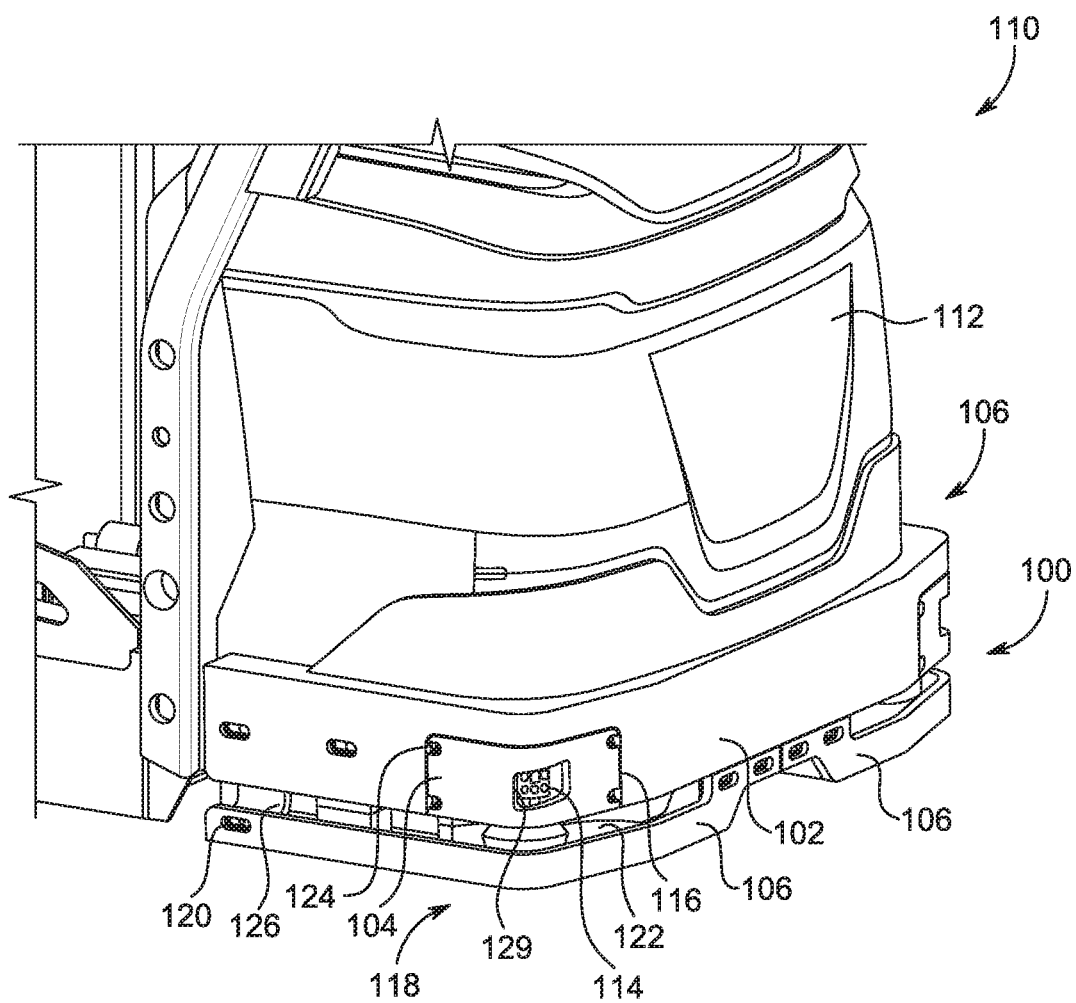
FIG. 1 is a front, left view of an assembled bumper assembly installed on a material handling vehicle according to an aspect of the present disclosure.
Figure 2:
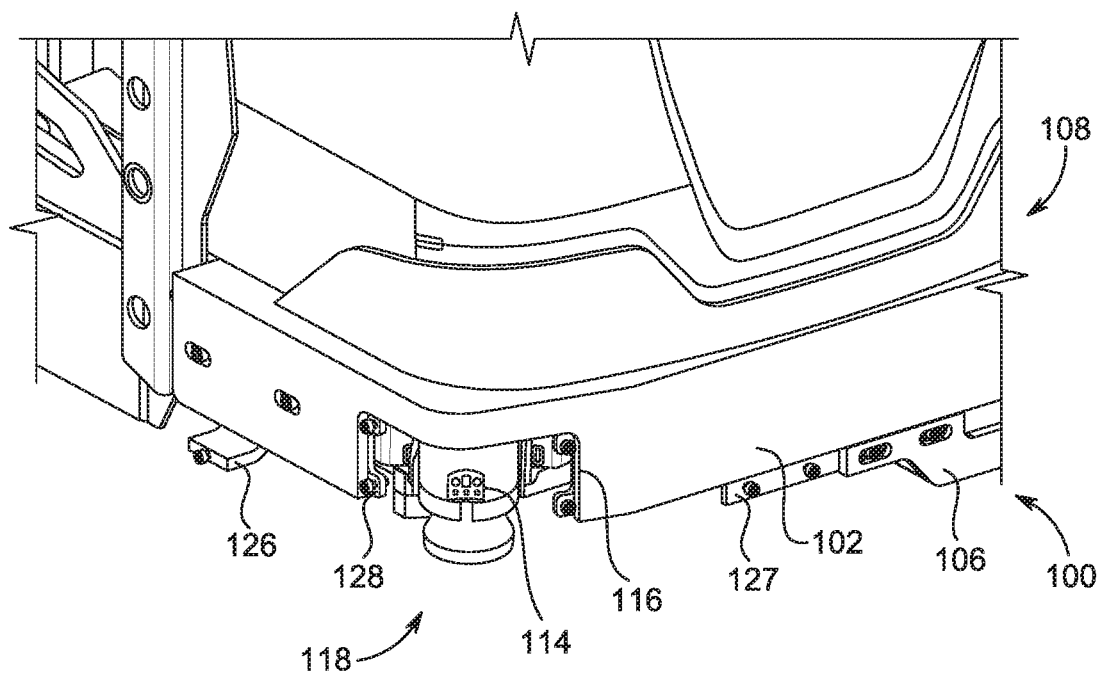
FIG. 2 is a front, left view of the bumper assembly of FIG. 1 with a lower section removed.
Figure 3:
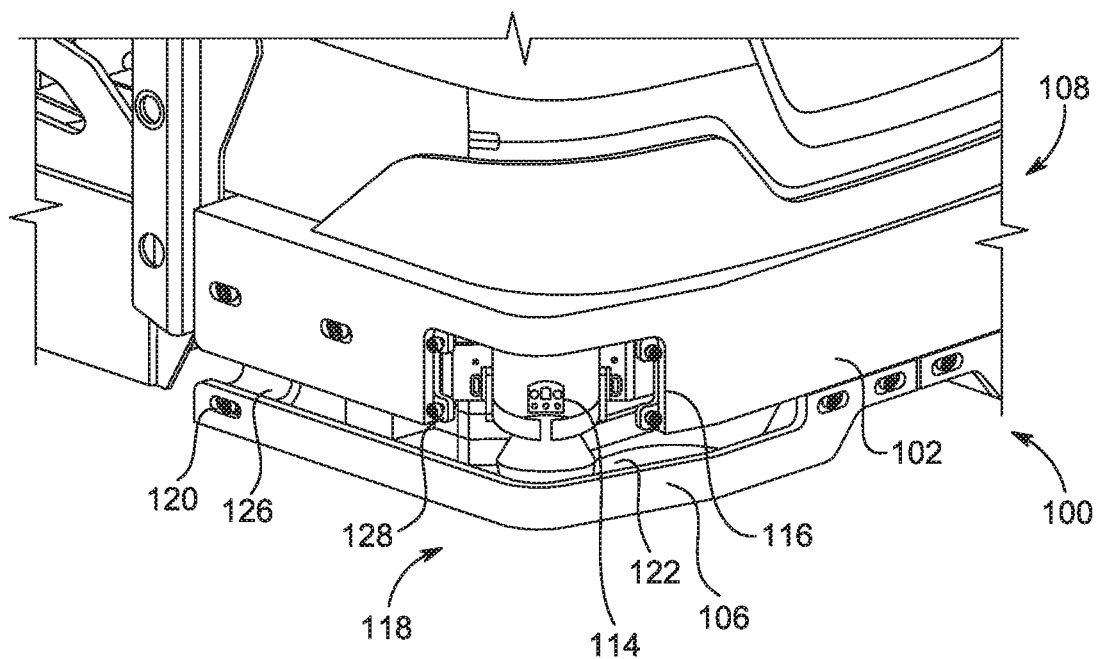
FIG. 3 is a front, left view of the bumper assembly of FIG. 2 with the lower section installed to a main body.
Figure 4:
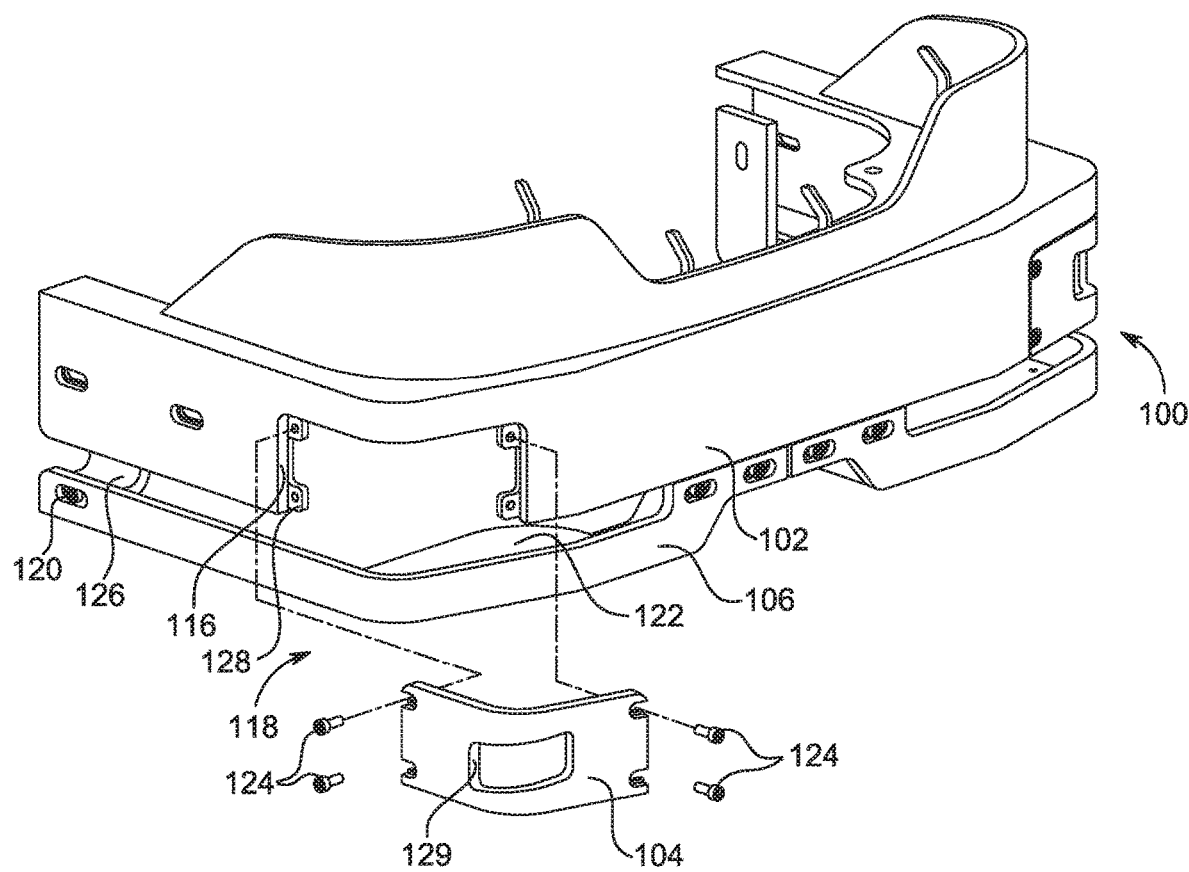
FIG. 4 is a partially exploded front, left view of the bumper assembly of FIG. 1 with a window plate exploded out.
Figure 5:
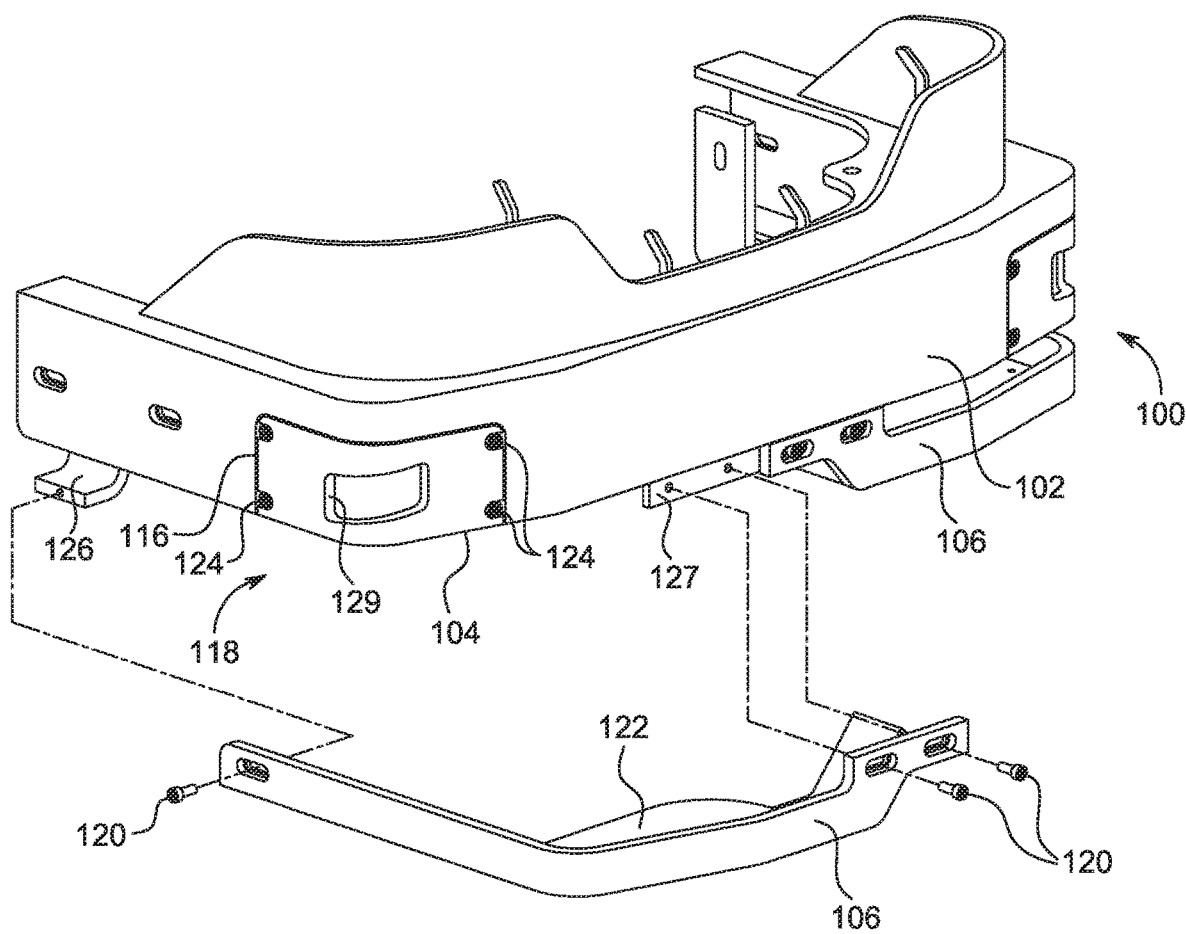
FIG. 5 is a partially exploded front, left isometric view of the bumper assembly of FIG. 1 with a lower section exploded out.

Before any aspect of the present disclosure are explained in detail, it is to be understood that the present disclosure is not limited in its application to the details of construction and the arrangement of components set forth in the following description or illustrated in the following drawings. The present disclosure is capable of other configurations and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use aspects of the present disclosure. Various modifications to the illustrated configurations will be readily apparent to those skilled in the art, and the generic principles herein can be applied to other configurations and applications without departing from aspects of the present disclosure. Thus, aspects of the present disclosure are not intended to be limited to configurations shown, but are to be accorded the widest scope consistent with the principles and features disclosed herein. The following detailed description is to be read with reference to the figures, in which like elements in different figures have like reference numerals. The figures, which are not necessarily to scale, depict selected configurations and are not intended to limit the scope of the present disclosure. Skilled artisans will recognize the non-limiting examples provided herein have many useful alternatives and fall within the scope of the present disclosure.

Semi-autonomous and autonomous material handling vehicles may require at least one object detection sensor. Conventional semi-autonomous and autonomous material handling vehicles typically include at least one object detection sensors mounted adjacent to a floor on which the material handling vehicle travels, which defines a field of view that is substantially parallel to the floor. To cover the object detection sensor, the object detection sensor may be mounted behind a bumper of the material handling vehicle. On conventional material handling vehicles, the bumper may be a unitary or one-piece component that requires removal of the entire bumper to service or replace the object detection sensor. Alternatively, the bumper may be a permanent fixture on a conventional material handling vehicle.

Generally, the present disclosure provides a multi-piece bumper assembly behind which one or more object detection sensors may be installed. For example, the bumper assembly may facilitate viewing, leveling/calibrating, maintaining, servicing, installing, and/or removing object detection sensors on a material handling vehicle, without requiring removal of the entire bumper assembly.

FIG. 1 illustrates one non-limiting example of a bumper assembly 100. The bumper assembly 100 includes a main body 102, a pair of window plates 104, and a pair of lower sections 106. In some non-limiting examples, the number of window plates 104 and lower sections 106 may correlate with the number of object detection sensors installed behind the bumper assembly 100. In other non-limiting examples, the window plates 104 and the lower sections 106 may accommodate one or more object detection sensors.

The main body 102 may be installed onto an end 108 of a material handling vehicle 110. The main body 102 may define a general U-shape having a compatible contour with the lower side (e.g., from the perspective of FIG. 1) of the end 108 of the material handling vehicle 110. In one non-limiting example, the main body 102 may be attached to a power section 112 of the material handling vehicle 110. The power section 112, for example, may be an enclosure that houses a motor, a transmission, and/or a battery (not shown), among other things.

The material handling vehicle 110 may be a semi-autonomous, fully autonomous, or a manually-driven vehicle. The material handling vehicle 110 may include one or more object detection sensors 114. In the illustrated non-limiting example, the bumper assembly 100 may house two object detection sensors 114 (e.g., one in each corner of the end 108 of the material handling vehicle 110). In some non-limiting examples, the bumper assembly 100 may house more or less than two object detection sensors 114 arranged in any location on the material handling vehicle 110. In general, the bumper assembly 100 provides a mounting arrangement for the object detection sensors 114 that provides an unobstructed field of view to maximize sensing capabilities and enables selective viewing, leveling/calibrating, maintaining, servicing, installing, and removing without requiring removal of the entire bumper assembly 100.

As shown in FIGS. 2-5, the main body 102 of the bumper assembly 100 may include a cutout 116 for each object detection sensor 114. The cutouts 116 may enable installation of the object detection sensor 114 therein and a corresponding window plate 104 may be installed over each cutout 116. The cutouts 116 may be arranged at a corner 118 of the main body 102 as illustrated in FIGS. 1-5. In another non-limiting example, the cutouts 116 in the main body 102 may be arranged at any location where the object detection sensors 114 are mounted on the material handling vehicle 110.

During assembly, the main body 102 may be attached (e.g., bolted on) to the end 108 of the material handling vehicle 110, and the object detection sensor 114 may be installed on the main body 102 and/or the material handling vehicle 110. The lower section 106 and the window plate 104 may then be installed onto the main body 102. In the some non-limiting examples, the lower section 106 may be removably coupled to the main body 102 of the bumper assembly 100. In the illustrated non-limiting example, the lower section 106 may be coupled via a screw, bolt, push-to-connect coupling, or any other fastener 120. The fastener 120 may couple to one or more lower section fastening tabs 126 (e.g., one for each of the lower sections 106 on the bumper assembly 100) that protrude from a side of the main body 102. In addition, the lower sections 106 may be removably coupled to a front fastening plate 127 that extends from a bottom edge (e.g., from the perspective of FIG. 5) of the main body 102. The fasteners 120 may be selectively removed from and installed to the lower section fastening tabs 126 and the front fastening plate 127 to allow the lower sections 106 to be removably coupled to the main body 102 independent of the window plate 104.

The lower sections 106 may define a general L-shape, configured to conform to the profile of the corner 118 of the main body 102. The lower section 106 may include a sensor plate 122 that extends inwardly from a corner thereof. When assembled, the sensor plate 122 may extend below the object detection sensor 114 to block debris or other material from skipping up and hitting the object detection sensor 114 during travel of the material handling vehicle 110.

The window plates 104 may be removably coupled to the main body 102 to cover the cutout 116. The window plates 104 may define a general L-shape to conform to the profile of the cutout 116. The window plates 104 may be coupled via a screw, bolt, push-to-connect coupling, or any other fastener 124. The window plates 104 may include a cutout or window 129 arranged therein. The window plate 104 may be installed over the object detection sensor 114 such that the sensing field of view is unblocked (i.e., the window 129 prevents blocking of the object detection sensor's 114 field of view). The fastener 124 may couple to one or more window plate fastening tabs 128 that protrude from the main body 102. The fasteners 124 may be selectively removed from or installed to the main body 102 to allow the window plate to be removably coupled to the main body 102 independent of the lower section 106.

In general, during operation, it may be typical for the object detection sensors 114 to be cleaned or leveled (i.e., to ensure that the sensor field of view is parallel with a floor on which the material handling vehicle 110 travels) regularly or on an as-need basis. To allow for easy and efficient maintenance/calibration, one or more of the window plates 104 (depending on if one or both object detection sensors 114 require maintenance/calibration) may be removed in order to provide access to the object detection sensors 114 while the main body 102 and lower section 106 remain attached. That is, the only components of the bumper assembly 100 that may be removed for maintenance/calibration of the object detection sensors 114 may be the window plates 104. Thus, the entire bumper assembly 100 does not need to be removed for maintenance/calibration of the object detection sensors 114.

In some instances, it may be required to remove an object detection sensor 114. In these instances, the design of the bumper assembly 100 allows the main body 102 to remain attached to the MHV and for the window plates 104 to remain attached to the main body 102, and only requires that one or more of the lower sections 106 be removed (depending on if one or both object detection sensors 114 require removal) to provide access to remove the object detection sensor(s) 114. Similarly, to install a new object detection sensor 114, only removal and re-installation of the lower sections 106 is required.

The bumper assembly 100 described herein allows for the main body 102 to remain attached to the material handling vehicle 110 during sensor installation/removal and maintenance/calibration, which reduces the time required to perform these tasks. The multi-piece design provides flexibility and ease of access for sensor installation/removal and maintenance by allowing selective removal of a desired piece (e.g., lower section 106 or window plate 104) depending on the service needed.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

We claim:

1. A bumper assembly for a material handling vehicle comprising:
   a main body including at least one cutout arranged on the main body;
   a window plate removably coupled to the main body and covering the at least one cutout, wherein the window plate includes a window arranged therein; and
   a lower section removably coupled to the main body and including a protection plate extending below the at least one cutout.

2. The bumper assembly of claim 1, wherein the main body is coupled to an end of the material handling vehicle.

3. The bumper assembly of claim 1, wherein the main body includes a first cutout in a first corner of the main body.

4. The bumper assembly of claim 3, wherein the first cutout is covered by a removably coupled first window plate.

5. The bumper assembly of claim 3, wherein a first lower section is removably coupled to the first corner of the main body.

6. The bumper assembly of claim 1, wherein the main body includes a second cutout in a second corner of the main body.

7. The bumper assembly of claim 6, wherein the second cutout is covered by a removably coupled second window plate.

8. The bumper assembly of claim 6, wherein a second lower section is removably coupled to the second corner of the main body.

9. The bumper assembly of claim 1, wherein the main body includes at least one fastening tab configured to receive the lower section.

10. The bumper assembly of claim 1, wherein the cutout includes at least one fastening tab configured to receive the window plate.

11. A material handling vehicle comprising:
    an object detection sensor;
    a bumper assembly configured to be mounted around object detection sensor, the bumper assembly including:
      a main body including at least one cutout arranged on the main body;
      a window plate removably coupled to the main body and covering the at least one cutout, wherein the window plate includes a window arranged therein, and wherein a field of view of the object detection sensor is unobstructed by a periphery of the window; and
      a lower section removably coupled to the main body and including a protection plate extending below the at least one cutout and over the objection detection sensor.

12. The material handling vehicle of claim 11, wherein the main body is coupled to an end of the material handling vehicle.

13. The material handling vehicle of claim 11, wherein the main body includes a first cutout in a first corner of the main body.

14. The material handling vehicle of claim 13, wherein the first cutout is covered by a removably coupled first window plate.

15. The material handling vehicle of claim 13, wherein a first lower section is removably coupled to the first corner of the main body.

16. The material handling vehicle of claim 11, wherein the main body includes a second cutout in a second corner of the main body.

17. The material handling vehicle of claim 16, wherein the second cutout is covered by a removably coupled second window plate.

18. The material handling vehicle of claim 16, wherein a second lower section is removably coupled to the second corner of the main body.

19. The material handling vehicle of claim 11, wherein the main body includes at least one fastening tab configured to receive the lower section.

20. The material handling vehicle of claim 11, wherein the cutout includes at least one fastening tab configured to receive the window plate.

* * * * *